J. C. GROVE.
Coffee-Pots.
No. 196,658.  Patented Oct. 30, 1877.
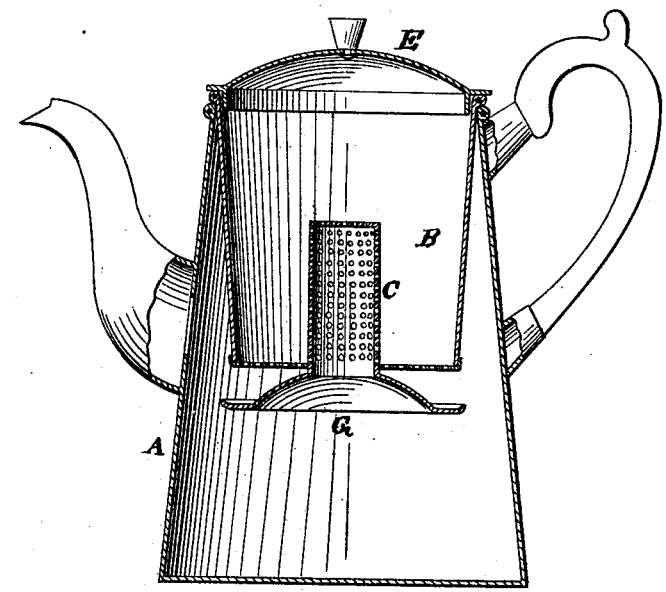
WITNESSES
INVENTOR
John C. Grove,
ATTORNEYS

UNITED STATES PATENT OFFICE.

JOHN C. GROVE, OF STAUNTON, VIRGINIA.

IMPROVEMENT IN COFFEE-POTS.

Specification forming part of Letters Patent No. 196,658, dated October 30, 1877; application filed June 26, 1877.

*To all whom it may concern:*

Be it known that I, JOHN C. GROVE, of Staunton, in the county of Augusta, and in the State of Virginia, have invented certain new and useful Improvements in Coffee-Pots; and do hereby declare that the following is a full, clear, and exact description thereof, reference being had to the accompanying drawing, and to the letters of reference marked thereon, making a part of this specification.

The nature of my invention consists in the construction and arrangement of an attachment for coffee and tea pots, as will be hereinafter more fully set forth.

In order to enable others skilled in the art to which my invention appertains to make and use the same, I will now proceed to describe its construction and operation, referring to the annexed drawing, which represents a vertical section of my invention.

A represents a coffee-pot of any ordinary construction. B is a cup fitting within the pot A, and constructed at its upper end in such a manner that it will rest upon and be suspended from the edge thereof. The bottom of the cup B is perforated with a number of small holes, as shown, and from the center of said bottom projects a tube, C, vertically upward into the cup for a suitable height. This tube is closed at its upper end, but both its body and top are also finely perforated.

The lower end of the tube C is open, and provided with an inverted funnel, G, which is immediately under the perforated bottom of the cup B, and of the same or larger diameter at its lower larger end than said perforated bottom. E is the cover of the pot, made to fit in the top of the cup B.

The coffee or tea is placed in the cup B, and the hot water poured in, which is then allowed to percolate through said coffee or tea; or, if preferred, cold water may be used instead of warm.

The pot being now placed over a fire for boiling, the steam and water will rise through the tube C—it being collected and guided by the funnel G—and pass into the cup B, and through the coffee or tea, and down again into the pot through the perforated bottom, thus causing a constant circulation through the same.

Having thus fully described my invention, what I claim as new, and desire to secure by Letters Patent, is—

In combination with a coffee or tea pot, the cup B, having perforated bottom, the perforated tube C, and inverted funnel G, substantially as and for the purposes herein set forth.

In testimony that I claim the foregoing I have hereunto set my hand this 14th day of June, 1877.

JOHN C. GROVE.

Witnesses:
FRANK GALT,
W. H. BYERLY.